US008443227B2

(12) United States Patent  
Carlough et al.

(10) Patent No.: US 8,443,227 B2
(45) Date of Patent: May 14, 2013

(54) PROCESSOR AND METHOD FOR WORKAROUND TRIGGER ACTIVATED EXCEPTIONS

(75) Inventors: Steven R. Carlough, Poughkeepsie, NY (US); Adam B. Collura, Hyde Park, NY (US); Wen H. Li, Poughkeepsie, NY (US); Eric M. Schwarz, Gardiner, NY (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 12/032,105

(22) Filed: Feb. 15, 2008

(65) Prior Publication Data

US 2009/0210659 A1    Aug. 20, 2009

(51) Int. Cl.
*G06F 11/00* (2006.01)

(52) U.S. Cl.
USPC ............................................................ 714/3

(58) Field of Classification Search ............... 714/3
See application file for complete search history.

(56) References Cited

U.S. PATENT DOCUMENTS

| 5,388,233 | A | * | 2/1995 | Hays et al. | 712/208 |
|---|---|---|---|---|---|
| 5,999,860 | A | | 12/1999 | Mintz | |
| 6,044,454 | A | * | 3/2000 | Schwarz et al. | 712/201 |
| 6,092,185 | A | * | 7/2000 | Slegel et al. | 712/219 |
| 6,178,495 | B1 | * | 1/2001 | Slegel et al. | 712/209 |
| 6,219,742 | B1 | | 4/2001 | Stanley | |
| 6,282,636 | B1 | * | 8/2001 | Yeh et al. | 712/218 |
| 6,553,548 | B1 | | 4/2003 | Hekmatpour | |
| 6,604,190 | B1 | * | 8/2003 | Tran | 712/207 |
| 6,732,298 | B1 | | 5/2004 | Murthy et al. | |
| 7,100,085 | B2 | | 8/2006 | Miller | |
| 7,231,548 | B2 | | 6/2007 | Ali | |
| 2004/0019771 | A1 | * | 1/2004 | Quach | 712/229 |
| 2006/0184771 | A1 | | 8/2006 | Floyd et al. | |
| 2006/0190707 | A1 | * | 8/2006 | McIlvaine et al. | 712/219 |

OTHER PUBLICATIONS z/Architecture. "Principles of Operation". Sixth Edition (Apr. 2007). IBM. 1218 pages.

* cited by examiner

*Primary Examiner* — Scott Baderman
*Assistant Examiner* — Jigar Patel
(74) *Attorney, Agent, or Firm* — Cantor Colburn LLP; John Campbell

(57) ABSTRACT

A processor includes a microarchitecture for working around a processing flaw, the microarchitecture including: at least one detector adapted for detecting a predetermined state associated with the processing flaw; and at least one mechanism to modify default processor processing behavior; and upon modification of processing behavior, the processing of an instruction involving the processing flaw can be completed by avoiding the processing flaw.

12 Claims, 4 Drawing Sheets

--PRIOR ART--

PROCESSOR AND METHOD FOR WORKAROUND TRIGGER ACTIVATED EXCEPTIONS

BACKGROUND OF THE INVENTION

This invention relates to computer systems and in particular to processors that use configurable hardware events to work around flaws that exist in the hardware design by detecting particular hardware events then activating a variety of pseudo-exceptions, each exception for causing behavior of the processor to be modified in a predefined way.

Modern microprocessors grow in complexity from generation to generation due to increasing functionality and performance as required by their consumers. As more functions are added, and more microarchitectural features are added, the processors become more susceptible to design flaws that might not be caught in simulation verification before designs are built into actual hardware. As it costs both time and money to rebuild hardware to fix such design flaws, it is becoming more economic to have some built-in capability to workaround design flaws if one is found. Certain examples of prior art techniques are provided below.

One example includes U.S. Pat. No. 7,100,085, entitled "System for automated problem detection, diagnosis, and resolution in a software driven system." This patent discloses a system having a database that contains entries with executable code that can make use of these services in order to monitor, diagnose, and solve specific problems. Each entry in the database addresses a specific problem. The executable code is designed to isolate and recognize the problem, and then implement a fix or workaround for that problem. The executable code is designed to completely automate the entire process of detection and resolution of the problem. Further, manual intervention may be employed to complete the diagnosis or solution. Unfortunately, this system is only implemented once a problem is detected and does not provide for avoidance of problem occurrence.

Another example is provided in U.S. Pat. No. 6,219,742, entitled "Method and apparatus for artificially generating general purpose events in an ACPI environment." This patent discloses hardware implementation of the General Purpose Event status register that supports the ability to assert, under software control, individual General Purpose Event status bits in a General Purpose Event register in an ACPI environment. Software control over the General Purpose Event register allows compensation of a platform electronic apparatus for design defects discovered late in the development cycle. Software control also enables the creation at any time of new "hardware events" which are then processed by the ACPI driver by means of manufacturer provided P-code. The ability to provide a software work-around for a wide range of ACPI related difficulties is advantageously created. Moreover, additional ACPI value-added features can thereafter be developed to differentiate and enhance ACPI compatible products. Similar to the first example, this patent is event related and does not provide for avoidance of problem occurrence.

Accordingly, what are needed are improved techniques for detecting situations within a processor and using those detections to avoid permitting a design flaw to effect a result. Preferably, the techniques provides flexible implementation of a variety of detections as well as a variety of actions activated via psuedo-exceptions to avoid an error related to a design flaw with minimal impact upon performance.

BRIEF SUMMARY OF THE INVENTION

In one embodiment, a processor includes a microarchitecture for working around a processing flaw, the processor including: at least one detector adapted for detecting a predetermined state associated with the processing flaw; and at least one mechanism to modify default processor processing behavior; and upon modification of processing behavior, the processing of an instruction involving the processing flaw can be completed by avoiding the processing flaw.

In another embodiment, a method of working around a processing flaw in a processor, the method including: detecting a predetermined state associated with the processing flaw; and activating at least one mechanism to modify default processor processing behavior; and upon modification of processing behavior, then completing processing of an instruction involving the processing flaw by avoiding the processing flaw.

Further embodiments include a computer processor method of modifying the function of a computer processor having an I-unit that fetches and decodes instructions, an E-unit that executes those instructions, and an interface between the I-unit and the E-unit enabling opcodes to be passed from the I-unit to the E-unit, the method including: fetching and decoding instructions with said I-unit having I-unit opcode compare logic and passing opcodes from the I-unit to said E-unit having E-unit opcode compare logic for execution, serializing in the E-unit the opcodes passed to said E-unit for execution; and comparing an opcode passed to the E-unit to determine whether or not said opcode matches a predefined pattern set up for the logic; wherein said E-unit contains process monitors that detect potential problem states associated with the opcode predefined pattern and when said process monitor detects said problem state and when a match of said opcode to said predefined pattern set up for the logic is found, said E-unit transmits said opcode that matches said predefined pattern set up for the logic across said interface between the I-unit and the E-unit, back to the I-unit along with an indication of an action to take over; whereupon the I-unit upon receipt by said I-unit of said indication of an action to take over said I-unit begins fetching and decoding instructions again and I-unit compare logic compares an instruction which said I-unit decodes against said opcode transmitted to it by the E-unit, and when they match the I-unit performs the action indicated to said I-unit by the E-unit, but, if they do not match, the I-unit processes the first instruction after said fetching and decoding instructions again began normally and also transmits and indication to the E-unit that the opcodes did not match back over the interface between the I-unit and the E-unit; wherein the E-unit opcode compare logic contains a latch that is set when a valid opcode compare occurs indicating a match with said predefined pattern set up for the logic, which latch is reset when an instruction completes execution normally, and which latch setting is held if the I-unit does not indicate it detected a mismatch on the instruction it just decoded, and temporarily disabling the function of the E-unit opcode compare logic when said latch is set, allowing the next instruction to complete execution.

BRIEF DESCRIPTION OF THE DRAWINGS

Referring now to the drawings wherein like elements are numbered alike in the several figures, wherein.

DETAILED DESCRIPTION OF EXEMPLARY EMBODIMENTS

Figure 1:
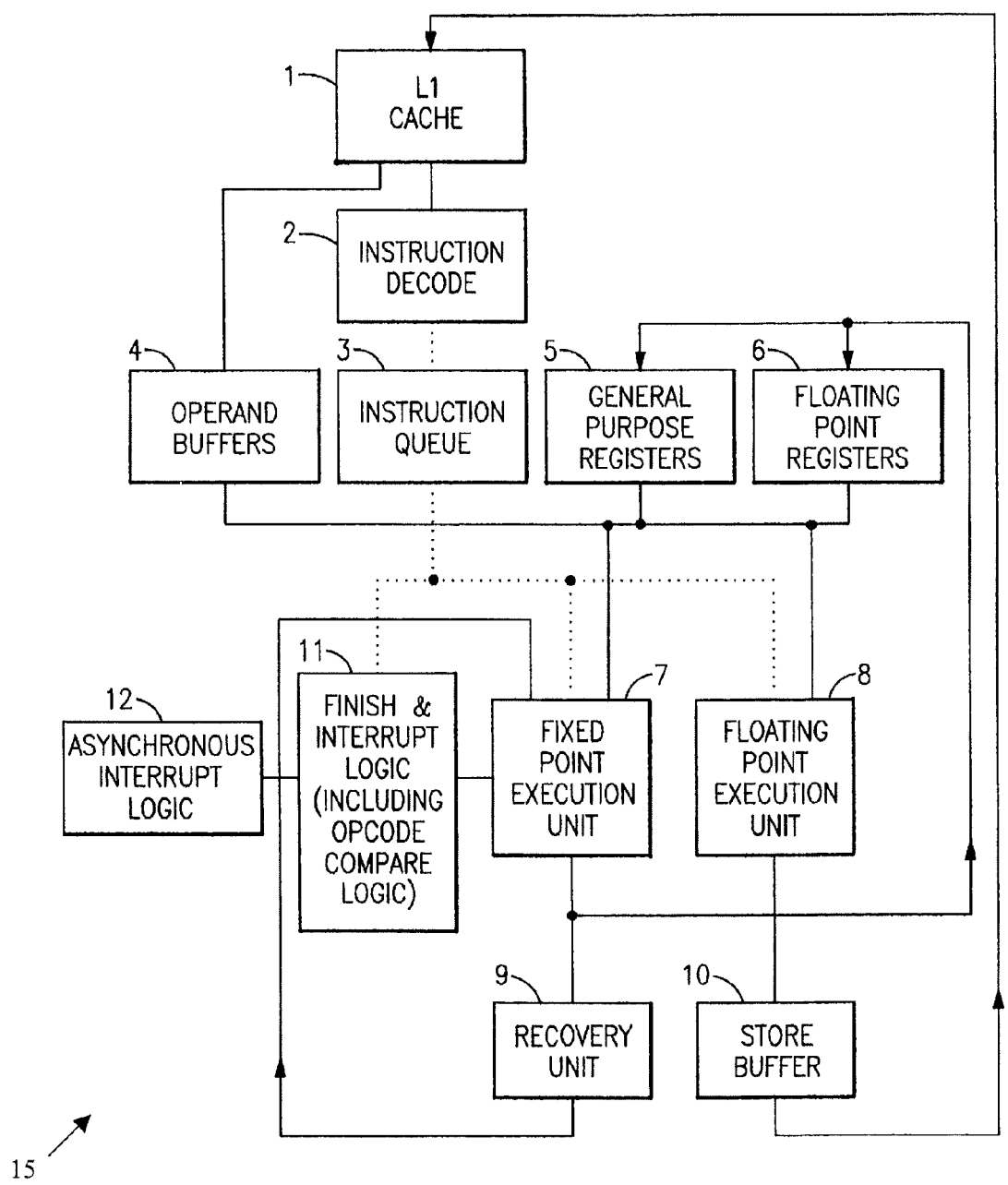
FIG. 1 provides an overview of a prior art central processing unit (CPU) incorporating certain control logic including opcode compare logic.

Disclosed herein are features and functions for incorporation into a processor as a microarchitecture (also referred to as an "architecture"), where the features and functions provide for detecting design flaws or situations within the processor and result in flexible implementation of a variety of psuedo-exceptions, the result having minimal impact upon performance of the processor. Prior to discussion of embodiments of the invention, some context is now provided discussing aspects of a processing unit.

Before considering embodiments of the invention in detail, consider that a central processing unit (CPU) typically contains an Instruction-Unit (I-Unit) for fetching and decoding instructions and an Execution-Unit (E-Unit) for actually executing the instructions. Some advanced CPUs also contain special logic to allow the processor to continue functioning even if there are design problems with the logic circuits. One example of this type of logic is "Opcode Compare" logic. This logic, typically located in the I-Unit, monitors instructions as they are decoded and if the instructions match a certain pattern set-up by the logic design engineer, some action would be taken. Possible actions might be to discard all execution of partially completed instructions and restart (serialization) or to force that instruction to microcode/millicode for execution.

One problem encountered when implementing Opcode Compare logic in the I-unit is that it often becomes part of the cycle-time limiting path for the processor. It also is somewhat limiting in the types of actions that can be taken as a result of a valid compare. Accordingly, Opcode Compare logic was added to the E-unit in addition to Opcode Compare logic in the I-unit.

However, when moving or adding the Opcode Compare logic to the E-Unit, other problems were identified. For example, after a valid comparison is obtained in the E-unit, for many actions, the processor must be serialized and instructions that have not yet been completed must be reprocessed; this would be the case if one wanted to force that instruction to be executed by microcode/millicode. When the instruction is decoded again in the I-unit, it might not be the same instruction. Some cases which might cause this include another processor in an SMP system stored into this processor's instruction stream, an asynchronous interrupt, etc. So, the I-unit can not blindly go ahead and take the action after being told to do so by the E-unit. Note the conditions that cause an instruction to be changed are very rare. However, it must be accounted for or the architecturally correct results will not be obtained.

The context provided here is discussed with specific regard to the ESA/390 or S/390 architecture and efficient implementation of the XC and MVC instructions. Both instructions have two commonly used varieties (no overlap, and one-byte destructive overlap) plus the very rare generalized destructive-overlap case. A typical hardware implementation might perform the two common cases in hardware but implement the generalized destructive-overlap case in microcode/millicode and so an efficient hardware mechanism is needed to accomplish this. One will recognize, however, that in general, other embodiments of processors having I-units and E-units may be used.

When the E-Unit Opcode Compare logic detects a match on an instruction that has been programmed into it by a logic designer, for most actions it must first serialize the processor. This discards any partially completed instructions, including the one that caused the Opcode Compare and any subsequent instructions. Any earlier instructions would have already completed and there results written to registers or stored into main storage.

The E-unit Opcode Compare logic then sends the opcode that it just detected on, back to the I-unit on a special purpose bus. This may be the architected opcode or, more likely, some internal encoding of the opcode that it originally received from the I-unit. It also passes back a code to the I-unit with the action the I-unit should take. Some examples might be to force this instruction to microcode/millicode for execution, or disable instruction overlap after this instruction decodes.

The I-unit would then begin instruction fetching again. When the I-unit decodes the first instruction, it must compare the opcode it decoded with the opcode it received on the bus from the E-unit. If they are the same, then the I-unit would take the action that was indicated by the E-unit. However, if the opcodes do not match, the I-unit must execute this instruction normally with no special handling. The latter case is the one where a different instruction is fetched after the serialization event.

However, there is still a significant problem with this mechanism. For example, an infinite loop in the processor is possible. Consider the case where the Opcode Compare logic was configured to serialize the processor before execution of the instruction that is detected. If nothing special were done, the E-unit would serialize before executing it, the I-unit would fetch/decode it and send it back to the E-unit, and the E-unit would again serialize before executing it. So the processor is stuck in an infinite loop.

To fix this problem, control logic may be added to the CPU which provides that the latch will be set if a valid opcode compare occurs; the latch will be held if the I-unit does not indicate it detected a mismatch on the last opcode compare; and the latch will be reset whenever an instruction completes normally. When the control logic latch is active, the E-unit Opcode Compare logic is temporarily disabled and the instruction is allowed to proceed to execution normally.

With regard to a portion of the added control logic, suppose an instruction has a valid Opcode Compare detected on it by the E-unit, but when the I-unit fetches/decodes it again it has been changed to a different opcode. The I-unit would detect the mismatch and send it with no special processing to the E-unit. However, since the control logic latch is now on, it would also block the Opcode Compare and it would be processed incorrectly. So when the I-unit detects this mismatch, it activates the portion of the control logic to the E-unit which clears the control logic latch.

This design also uses this mechanism to force the generalized destructive-overlap case of the S/390 instruction MVC and XC to millicode/microcode. The I-unit detects the destructive-overlap after the instruction has already been dispatched to the E-unit and it is too late to force it to millicode, itself. So the I-unit sends a signal to the E-unit informing it that an instruction has destructive-overlap. The E-unit then uses the mechanism discussed above to inform the I-unit to force the instruction to millicode.

Turning now to aspects of the prior art CPU in greater detail, it will be seen from FIG. 1 that a prior art processor 15 is shown with certain relevant components. In this example, an L1 cache 1 containing the most recently used instruction and operand data supplies instruction text to the instruction decode logic 2. This logic parses the instruction and passes the relevant components to the instruction queue 3 where it is held until it is ready to be executed. When an instruction has been decoded, the operand address(es) is calculated and the operand(s) for that instruction are fetched from the L1 cache and held in the operand buffers 4 until it is ready for execution. The general purpose registers 5 and floating-point registers 6 also supply operands to the execution unit. When all operands for a given instruction are available, the fixed-point execution unit 7 or floating-point execution unit 8 then typically executes some function on the operand(s) for that instruction. When the execution of that instruction is finished, the results of that instruction are written to the general purpose registers 5 or floating-point registers 6. If it was a store-type instruction the results are instead put into a store buffer 10 where they will eventually be written back to the L1 cache 1. In parallel with writing results to the general purpose registers 5 or floating-point registers 6, results are also written to registers in the recovery unit 9 which contains the complete micro-architected state of the processor at any given time. Note that certain control registers may have local shadow copies within the instruction unit, execution unit, or other areas of the processor but the master copy of these control registers is always the recovery unit 9. In parallel with all the above operations, the finish and interrupt logic 11 is continuously monitoring and controlling the completion of the execution of all instructions and the writing of their results. Also, the asynchronous interrupt logic 12 is continually monitoring for pending asynchronous interrupts and presenting them to the finish and interrupt logic 11. The finish and interrupt logic 11 contains the E-unit opcode compare logic and continually monitors instructions that are presented by the instruction queue 3 for execution in the E-unit. An alternative implementation may have this as separate logic within the E-unit.

Figure 2:
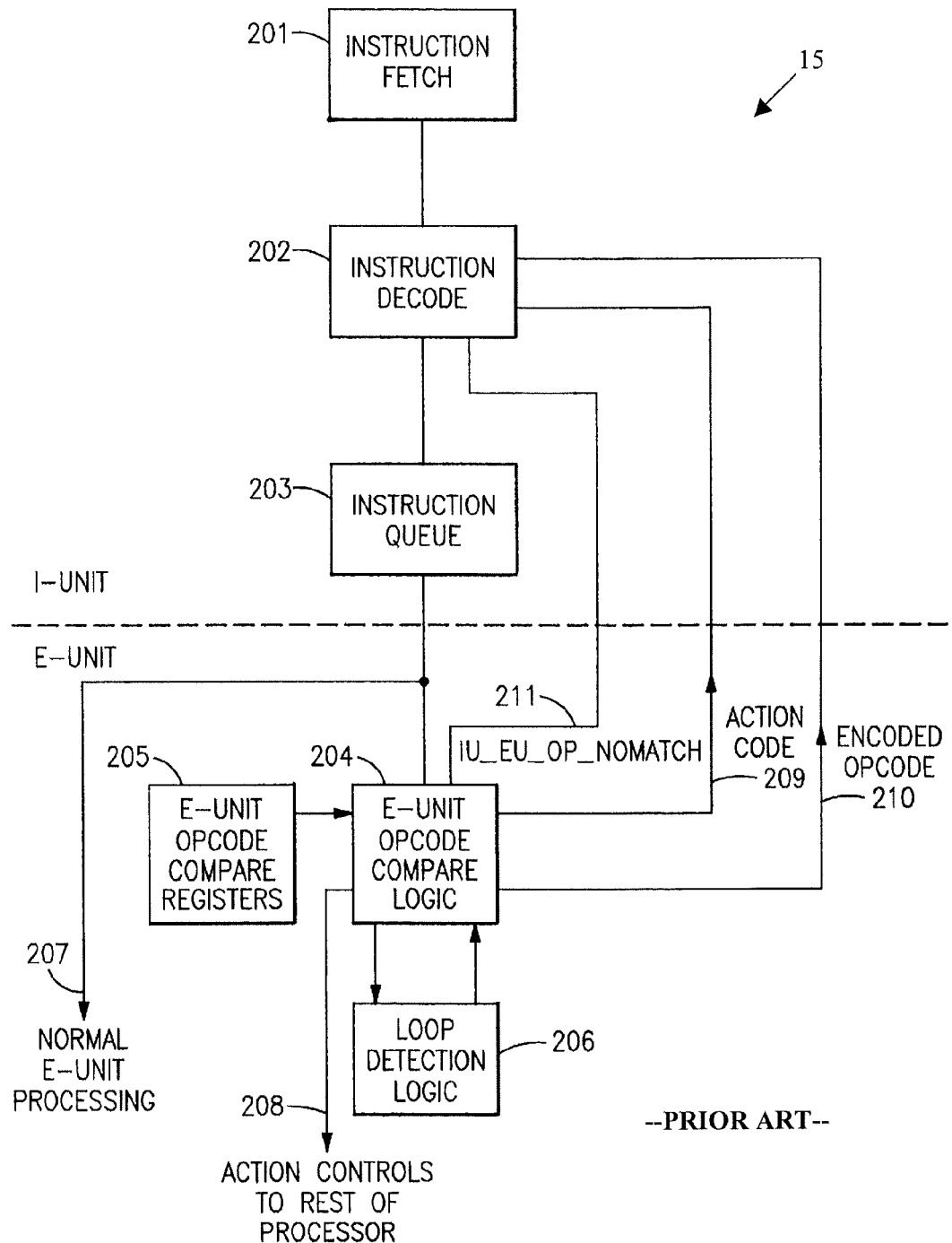
FIG. 2 provides more detail regarding the prior art CPU of FIG. 1.

FIG. 2 shows further aspects of the Opcode Compare logic applicable to the prior art processor 15 in more detail. The instruction fetch logic 201 fetches blocks of data from a cache or main storage and presents it to the instruction decode logic 202. This logic parses the instruction and passes the relevant components to the instruction queue 203 where it is held until it is ready to be executed. Note the instruction decode logic 202 may also contain Opcode Compare logic that is generally independent. When the E-unit is ready to accept a new instruction the parsed components are passed from the instruction queue 203 to the norm E-unit execution logic 207. In parallel, the E-unit Opcode Compare logic 204 compares this instruction with values stored in compare registers 205 to determine if this opcode matches what has been set up by the computer designer. If it does not match, no further action is taken by the E-unit Opcode Compare logic and processing of the instruction continues normally by the rest of the E-unit. If the Opcode Compare logic detects a match, further special action is taken based on action codes stored in the compare registers 205. For some types of action (e.g. delay execution of further instructions in the E-unit after completion of this one, serialize the processor after execution of this instruction, etc.), signals are sent directly to the other logic in the processor 208 to accomplish this. However, if it is an action that requires serialization of the processor before executing the instruction, the processor is serialized immediately and an action code 209 is sent back to the I-unit informing it what action to take. In addition, the opcode that compared (possibly encoded in some way) is also sent back to the instruction decode logic 210. The instruction decode logic 210 then takes an action based on the opcode compare indication from the E-unit along with that new instruction it later decodes. If when the instruction decode logic 202 decodes the next instruction and it is not the same as the one the E-unit opcode compare detected on and informed the I-unit 210, then the I-unit informs the E-unit of this fact via the portion of control logic signal 211. The loop detection logic 206 contains the control logic latch that indicates that it has just serialized the processor and it should let the next instruction be processed normally without any special Opcode Compare actions. However, even if the control logic is active and the portion is also active, then the control logic is reset and the Opcode Compare logic is available to handle the next instruction presented to the E-unit.

Further information regarding the prior art processor 15 may be found in U.S. Pat. No. 6,092,185, entitled "Opcode compare logic in E-unit for breaking infinite loops, detecting invalid opcodes and other exception checking" and incorporated herein by reference in its entirety. Unfortunately, implementation of workarounds can cause an impact upon performance of the CPU.

Accordingly, the invention disclosed herein includes microarchitecture that allows a problematic instruction type to execute and conditionally sets one of several pseudo exception codes that allow completion logic of the processor to take action based on the exception code that is generated. The workaround mechanism can be conditionally activated, in conjunction with opcode compare indication, with various "pseudo exception" response to the completion logic by potentially qualifying with: data input characteristics; data output characteristics, including flags, floating point controls (fpc), etc.; specific arithmetic conditions; and other predetermined problematic conditions, including pipeline interactions.

For example, if an error exists in the design of a floating point instruction, it often only occurs on a denormal number result, which is uncommon. The architecture provided herein only generates the pseudo exception if the specific problem condition is active. For example, for a floating-point unit, a denormal number result detector can be used as one such problem condition employed by the architecture.

Examples of some of the responses the processor's completion logic can take for any given "pseudo exceptions" include: redo of a current instruction; redo of a subsequent instruction in a pipeline; and redo of a current instruction in millicode. For a long pipeline execution unit, like a binary floating point unit, this allows each pipeline stage to independently calculate the corresponding conditions, and send any required corresponding workaround at the precise instruction.

Accordingly, the teachings herein make use of detectors for examining each processor state that has been known to cause problems in past designs. These detectors can be used to mask opcode compare based workaround triggers or may be used to trigger workaround actions independent of opcode comparison. Furthermore, using a pseudo-exception mechanism for actuating the modified instruction behavior provides a cleaner and less error-prone design then configuring a separate mechanism parallel to the existing hardware exception and completion logic for handling work-around cases. By routing workaround triggers through a processor's completion and exception handling logic rather than directly to the an execution unit's hardware that may modify that execution unit's basic dataflow or control behavior, it is less likely for a design flaw to occur in which an instruction is permitted to execute normally despite the fact that a work around trigger had been activated.

In various embodiments, detectors for hardware states or certain data value situations inside execution units, which have been known to be related to past design flaws are provided and those detectors conditionally trigger pseudo-exceptions in the processor. Each of the possible pseudo-exceptions cause a different behavior in the processor 10, these behaviors are designed to avoid a potential design flaw.

Furthermore, the architecture provided herein can be used to enhance the existing art of using the opcode compare detection logic, such that these pseudo-exceptions are generated for a preselected instruction or instruction sequence, and only on isolated processor states that are found to exist.

In general, the manufacturer of the processor may configure which hardware events are used to activate any particular exception during hardware testing and possibly for the shipping of that hardware product.

Figure 3:
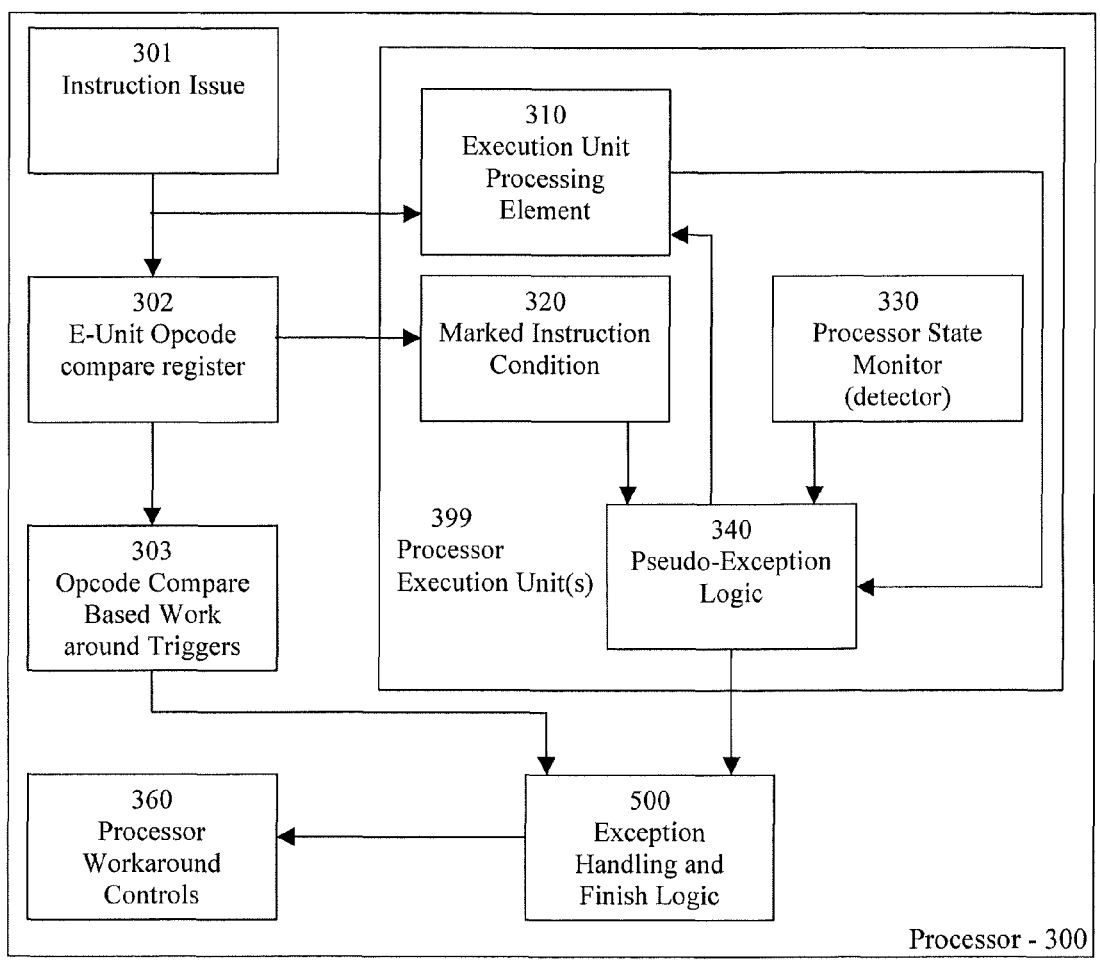
FIG. 3 illustrates aspects of extending opcode compare based workaround triggers with a processor state monitor that activate pseudo-exceptions.

Turning now to the drawings in greater detail, FIG. 3 shows one example of how a processor 300 with opcode compare based workaround triggers can have its workaround capabilities extended with execution state based workaround triggers to activate pseudo-exceptions. FIG. 3 begins with block 301, which illustrates instruction issue to a plurality of execution units, with one execution unit depicted by reference number 399. Depending on the processor 300, the execution unit(s) 399 can include one or more units for executing fixed point operations, floating point operations, load and store operations, vector operations or any number of other units that can be found in modern processors. The instruction issue 301 may also be sent to an E-Unit Opcode compare register 302, similar to that described in U.S. Pat. No. 6,092,185, and incorporated herein by reference in its entirety. Generally, the E-Unit opcode compare register 302 is configured by a manufacturer of the processor 300 with the opcodes or opcode families that are known to have at least one design flaw.

In operation, the opcode compare register 302 sends information to a respective execution unit 399 with a Marked Instruction Condition 320 signaling to the respective execution unit 399 that it is executing an instruction or an instruction sequence that is known to or suspected to contain a design flaw. The opcode compare register 302 also sends information to an Opcode compare based workaround triggers unit 303 that is used to activate workaround triggers based solely on opcode compare results. Rather then connecting the Opcode compare based workaround triggers unit 303 directly to the Processor Workaround controls 360, workaround trigger information is sent to an Exception Handling and Finish Logic unit 350 in the form of pseudo-exceptions.

In some embodiments, each Processor Execution Unit 399 includes an Execution Unit processing element 310 that performs the operation defined by the instruction on possible operands (not shown). In addition to any resulting data (not shown) the Execution Unit processing element 310 sends finish information (such as condition codes and exception information which is used by the Exception Handling and Finish Logic 350). In some embodiments provided herein, finish information is sent first to a Pseudo-Exception Logic 340 of the processor execution unit 399. The Pseudo exception logic 340 either passes the finish controls on to the processor's Exception Handling and Finish Logic unit 350 (for example, under normal execution conditions), or can mask the normal completion signals and generates a Pseudo Exception code instead. Based on Pseudo-Exception code, the Finish logic can either complete the current instruction or cause it or the next instruction to be re-executed under modified behavior.

In architecture that allows direct trapping at the software level, such as a hypervisor, the Finish Logic can also arm a software trap to allow special software handling of the design flaw conditions. In the case where a Pseudo Exception is detected early in the execution of an instruction, and it is a non-completing pseudo exception type (i.e., the current instruction will be re-executed under modified behavior so the completion of the current instruction is not necessary, a separate signal is sent from 340 back to 310 to indicate it can end immediately). This can improve performance since the processor 300 would have otherwise had to wait for a potentially long running instruction (such as floating point division) to complete. This Pseudo-exception code is then forwarded to the Processor Workaround Controls 360 that causes, based on the pseudo-exception code, modified behavior in the processor 300. This modified behavior can effect re-execution of the current instruction as discussed, or can effect the execution of subsequent instructions.

Figure 4:
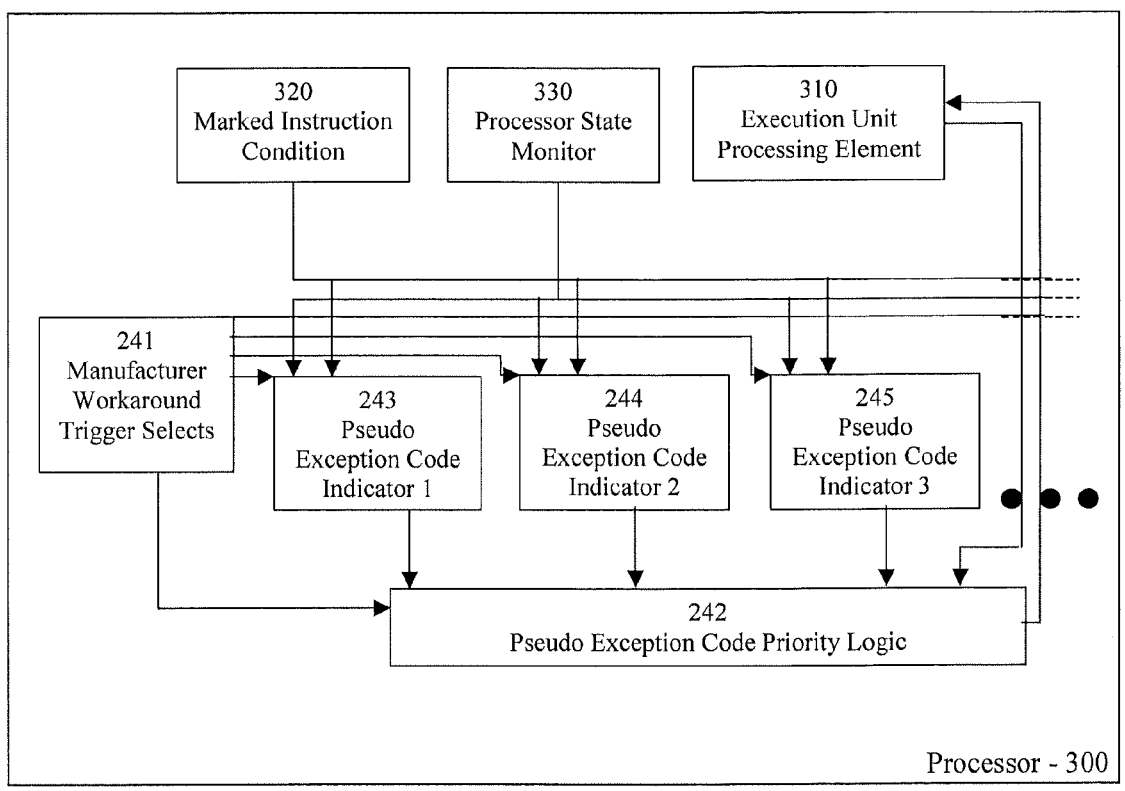
FIG. 4 provides a more detailed illustration of the Processor State Monitor and Pseudo-Exception Logic of FIG. 3.

FIG. 4 provides greater detail of a processor state monitor 330, the Marked Instruction Condition 320, and the Pseudo-Exception Logic 340. In addition, greater detail is provided regarding what kinds of problem states would be useful conditions to detect in the Processor State Monitor (i.e., detector) 330, and what kinds of actions are typically taken by the Processor Workaround controls 360.

Referring in greater detail to FIG. 4 the Pseudo-Exception Logic 340 from FIG. 3 is shown to include a Manufacture Workaround trigger Selects 241, multiple Pseudo Exception Code Indicators 243, 244, 245, and Pseudo Exception Code Priority Logic 242. As previously discussed, the marked Instruction Condition 320 is an indicator that the opcode compare register 302 is indicating that the current instruction is a match for an operation or state known to have a design flaw. The Processor State Monitor 330 includes information about the state of the processor 300 or of the instruction currently being executed.

As an example, consider exemplary operations or states of a Floating Point Unit (FPU—one of the execution units 399). In one embodiment, the processor 300 may be preconfigured to account for operations or states such as, for example:

1. An Exponent rebias occurs. This occurs in floating point units when an underflow or overflow occurs with the traps flag enabled. Exponent rebias cases can be prone to error since often it can also require a realignment of the coefficient.
2. A Fast Instruction is executing in the pipe. Fast instructions have the minimum possible latency through the unit pipeline and therefore have the greatest possibility of colliding with the resolution of previous instructions such as unresolved branches.
3. A Division with an exact quotient. This is typically an early ending condition for decimal floating point division and since it is a special case of division, tends to be more prone to a design error.
4. Subnormal or Denormal Result. This indicates that the result is subnormal or denormal as specified by the IEEE standard for floating point arithmetic. Subnormal and denormal numbers have been prone to errors in previous floating point designs.
5. Result is quasi-supernormal. Quasi-supernormal results occur during decimal floating point division and multiplication operations and require special exponent processing.
6. Result has been rounded. This is an indicator that the result is not exact and has been rounded according to the state of the machines rounding mode.
7. True Condition. This is an Always True indicator and is used by the Pseudo Exception Code Indicator when it is set to use the only the Marked Instruction Condition to set a Pseudo Exception. This integrates the traditional opcode compare based workaround triggers with the invention.

8. Stall Execution. This typically occurs when the processor 10 must wait for data to be loaded from a cache of the processor. Processor stall conditions are typically a source of design errors found late in implementation.
9. Partial reject. For operations with multiple data transfer cycles it's possible that a piece of the data sent from the cache is stale. When this occurs the good data must be held while the stale data is rejected and reloaded. This condition is useful to avoid a common design flaw area concerning in a processor's ability to avoid executing on stale data.
10. Early Dispatch. While executing a current instruction, a second instruction was sent to the unit before it was ready to receive it. This is typically an error condition resulting in recovery reset, a lengthy process of restoring the machines states to a previous value, and also in both instructions getting reissued in slow mode, a modified execution mode where only 1 instruction is executed at a time. This impacts performance. In this case rather then severely impacting performance in this way, a specific pseudo-Exception code can be sent that allows the current instruction to complete and forces the instruction that was sent too early to be reissued a second time. Further discussion on the pseudo exception codes and their appropriate actions are discussed below.

Referring again to FIG. 4, any of these operations or states found to be problem areas and a likely source of late design flaws are detected by the processor state monitor 330. Detected events are sent to the various Pseudo Exception Code Indicators 243, 244, 245. Each Pseudo exception code indicator 243, 244, 245 sends a specific pseudo exception code to the pseudo exception code priority Logic 242. Like the Opcode Compare Registers 302 previously discussed, the Manufacturer Workaround trigger Selects 241 are programmed hardware registers setup by the manufacturer of the processor 300 before it is enabled. These settings of the programmed hardware registers specify all of the conditions that each of the Pseudo exception Code Indicators 243, 244, 245 will use as a condition to send pseudo exception code to the pseudo exception code priority logic 242. These conditions can be any AND or OR combination of the state indicators from the Processor State Monitor 330. Furthermore, the Pseudo Exception Indicator 243, 244, 245 can trigger an exception independent of the Marked Instruction Condition 320 or only when the Marked Instruction Condition 320 is on.

The Pseudo Exception Code Priority Logic 242 receives both the instruction completion information from the execution Unit Processing Element 310 as well as the various Pseudo Exception code Indicators. If multiple pseudo-exceptions are active 242 will prioritize them based on additional Manufacturer Workaround trigger Selects 241. If the Pseudo Exception is a non-completion type (i.e., the results of the current instruction are not going to be used to update processor state), a signal can be sent back to the Execution Unit Processing Element telling it to exit early.

Possible Pseudo exceptions and corresponding workaround actions actuated by the Process Workaround Controls 360 include:
1. Reissue the current instruction to millicode. Generally, this is only applicable if the processor 300 is millicode capable. In this case, the Exception Handling and Finish Logic 350 for this type of pseudo-exception will discard the current instructions results and the Pseudo-Exception Code Priority Logic 242 will signal to the Execution Unit Processing Element 310 to exit early. The Processor Workaround Controls 360 are instructed to reissue the instruction to the millicode engine (not shown) where it is executed in a software routine of simpler instructions, allowing the hardware design flaw to be circumvented.
2. Set special trap to software. For this pseudo-exception type the current instruction completion is not permitted, and a software trap or predefined program interrupt type is set. This is typically done if the system is not millicode capable, and any form of hardware reexecution cannot mitigate the design flaw. A trap to software will most likely involve the hypervisor level to emulate such instruction with simpler instructions.
3. Reissue the current instruction. Similar to the previous pseudo-exception the results of the current instruction are ignored and the instruction ends early, but in this case the instruction is simply reissued to the hardware normally rather then to the millicode engine. This is typically done if there is found to be a problem forwarding data to the target instruction through the bypass mechanisms. Reissuing the target instruction insures the potentially problematic bypass mechanism will not be used.
4. Reissue the next instruction. For this pseudo-exception type the current instruction is permitted to complete normally but the next instruction in the pipe is rejected and reissued to hardware. This is typically done if there is a problem found in bypassing data out of the current target instruction.
5. Other workaround actions may include, for example, serialization where the current instruction's results are discarded and is re-executed alone in the processor by disabling instruction pipelining in the processor for a specific period of time.

As a result of the summarized invention, technical effects and benefits include a solution which provides greater refinement on the conditions that actuate work around logic. This provides greater performance then a standard opcode compare mechanism since the instruction containing the design flaw does not always have to activate the work around trigger, but can be set only to activate it if a certain condition exists in the hardware. Furthermore, existing opcode compare logic can be reserved for other design flaws since the logic can be programmed to actuate a work around trigger independent of opcode compare logic results.

Stated another way, and by way of example, the states of the processor 300 detected according to the teachings herein are not error conditions. Rather, the states are normal operational conditions or states in the processor 300. The states relate to known or hard to detect bugs, and are therefore identified as possible triggers for workaround(s). If a bug is found, then these states are used to trigger modified behavior in the processor 300 such that the possibility of the bug causing a problem is avoided. This is in contrast to detecting an error and recovering from it. Consider an example.

In the case of multiplication, a Multiplier component multiplies a multiplicand and multiplier. Suppose a design flaw exists, such that if the multiplier is seven (7), the processor 300 treats the multiplier like an eight (8). From this example, if one uses the multiplier when the multiplicand is seven (7), one would get the wrong answer. The error is not detected, and the wrong result is obtained.

One workaround might be to simply avoid the multiplier component. That is, instead of using the multiplier, the processor 300 could serially add the multiplicand to itself N times where N in the value of the multiplier. However, more efficient techniques may be had.

Consider use of two detectors, where detector1: detects if the multiplier is odd; detector2: detects if the multiplier is even. In order to avoid the problem, detector1 is coupled to activate the workaround. For any odd multiplicand, the problem is completely avoided. Of course, this impacts the performance for any odd multiplier, but this does not impact all multiplication operations.

Workaround capabilities of a processor can be significantly enhanced using processor state monitors in addition to traditional opcode compare based workaround mechanisms. Conditions where workaround behavior is invoked can be made more refined, resulting in significantly better performance when an instruction workaround is needed. Furthermore, using pseudo-exceptions to trigger workaround activity through the processors completion logic rather then directly triggering workaround control logic provides for greater flexibility in workaround options and is less prone to design error.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A processor configured to perform:
enabling as a workaround trigger, a data dependent execution state of an instruction to be executed, the instruction comprising an opcode;
associating the workaround trigger with an opcode compare result;
initiating execution of the instruction within a microarchitecture of the processor, the execution comprising:
determining, within the microarchitecture, whether an event matching the workaround trigger is encountered by the execution of the instruction, the determining based on one of: data input characteristics, data output characteristics, and floating point controls;
setting a pseudo exception based on determining that the event matching the workaround trigger is encountered, the pseudo exception set based on a plurality of pseudo exception codes available to modify behavior of the processor based on the pseudo exception that is set;
performing a predetermined work-around action to finish execution of the instruction based on the pseudo exception that is set from the plurality of pseudo exception codes, the opcode of the instruction, and data associated with the instruction; and
finishing execution of the instruction without performing the predetermined work-around action based on the executing instruction not setting the pseudo exception.

2. The processor as in claim 1, further comprising a pseudo-exception logic unit of an execution unit of the computer, the pseudo-exception logic unit indicating to an exception handling and finish logic unit whether the instruction execution state has been encountered while executing the instruction; and
causing, by the exception handling and finish logic unit, the computer to perform the work-around action based on the indicating whether the execution state has been encountered.

3. The processor as in claim 1, wherein a predetermined processor design flaw that is associated with the instruction execution state resides in an execution unit.

4. The processor as in claim 2, wherein the execution unit comprises a unit for at least one of fixed point operations, floating point operations, load and store operations and vector operations.

5. The processor as in claim 1, wherein the instruction execution state comprises at least one of: an exponent rebias; a fast instruction execution; a division with an exact quotient; a subnormal result; a denormal result; a quasi-supernormal result; a rounded result; a true condition; a stalled execution; a partial reject; and an early dispatch.

6. A method of working around processing flaws in a processor, the method comprising:
enabling as a workaround trigger, a data dependent execution state of an instruction to be executed, the instruction comprising an opcode;
associating the workaround trigger with an opcode compare result;
initiating execution of the instruction within a microarchitecture of the processor, the execution comprising:
determining, within the microarchitecture, whether an event matching the workaround trigger is encountered by the execution of the instruction, the determining based on one of: data input characteristics, data output characteristics, and floating point controls;
setting a pseudo exception based on determining that the event matching the workaround trigger is encountered, the pseudo exception set based on a plurality of pseudo exception codes available to modify behavior of the processor based on the pseudo exception that is set;
performing a predetermined work-around action to finish execution of the instruction based on the pseudo exception that is set from the plurality of pseudo exception codes, the opcode of the instruction, and data associated with the instruction; and finishing execution of the instruction without performing the predetermined work-around action based on the executing instruction not setting the pseudo exception.

7. The method as in claim 6, further comprising a pseudo-exception logic unit of an execution unit of the computer, the pseudo-exception logic unit indicating to an exception handling and finish logic unit whether the instruction execution state has been encountered while executing the instruction; and causing, by the exception handling and finish logic unit, the computer to perform the work-around action based on the indicating whether the execution state has been encountered.

8. The method as in claim 6, wherein the predetermined workaround action prevents completion of the instruction and directs re-execution of the instruction.

9. The method as in claim 6, wherein the predetermined workaround action prevents completion of the instruction and directs re-execution of the instruction under modified behavior.

10. The method as in claim 6, wherein the predetermined workaround action prevents completion of the instruction and directs the next instruction to be flushed from a pipeline and re-executed.

11. The method as in claim 6, wherein the predetermined workaround action directs completion of the current instruction and directs the next instruction to be flushed from a pipeline and re-executed under modified behavior.

12. The method as in claim 6, wherein the predetermined workaround action comprises a workaround to at least one of: reissue a current instruction to millicode; set a trap to software; reissue the current instruction; reissue the next instruction; perform serialization.

* * * * *